__United States Patent Office__

3,222,130
Patented Dec. 7, 1965

3,222,130
PROCESS FOR THE PREPARATION OF
NORDSTRANDITE ALUMINA
Ulrich Hauschild, Hannover, Germany, assignor to Kalie-Chemie Aktiengesellschaft, Hannover, Germany
No Drawing. Filed July 19, 1962, Ser. No. 211,112
Claims priority, application Germany, July 21, 1961,
K 44,303
7 Claims. (Cl. 23—143)

The invention relates to a method for the preparation of nordstrandite.

Only recently, R. A. Van Nordstrand, W. P. Hettinger, and C. D. Keith have found that there is, in addition to the $Al(OH)_3$ modifications bayerite and hydrargillite, the latter also called gibbsite, particularly in the English and American literature, a third $Al(OH)_3$ modification (Nature, vol. 177 (1956), page 713). Said modification has been designated as randomite, nordstrandite, and bayerite II, and will be called hereafter nordstrandite.

Until now, it has not been possible to prepare said $Al(OH)_3$ modification in pure form. According to the preparation method disclosed in the paper referred to above, dilute aqueous aluminum salt solutions are precipitated with ammonium hydroxide or soda solution to an alumina hydrogel. After washing with ammoniacal water, said gel is allowed to stand in an ageing solution at a pH of 7.5 to 13, and filtered and dried after a certain time. In this way, products are obtained which are always mixtures of nordstrandite and bayerite and which frequently also contain hydrargillite and boehmite AlO(OH). For this reason, the assumption was justified that nordstrandite could be prepared only in admixture with bayerite.

I have found that nordstrandite, which is free from bayerite and hydrargillite, can be prepared in a simple manner by reacting aluminum with aqueous solutions of alkylenediamines at temperatures below 80° C. A particularly suitable alkylenediamine is ethylene diamine, as it is cheap and can be mixed with water in any proportions. Other lower alkylene diamines, such as dl-propylenediamine or butylene diamine, show also good reactivity. Longchain alkylenediamines are less suitable because of their low water solubility. Generally, the concentration of the aqueous alkylenediamine solutions should not exceed about 40% because at higher concentrations the rate of reaction decreases too much. Particularly suitable are 1 to 25% solutions.

The aluminum is preferably used in finely comminuted form because the rate of reaction is the higher the greater the presented metal surface. After a short incubation time, mostly a violent reaction sets in with development of hydrogen; towards the end, the reaction proceeds quietly because a hydroxide layer deposits on the metal surface and interferes with the further reaction of the aluminum. Therefore, particularly if less finely comminuted metal is used, the reaction is carried out with stirring to keep the surface of the aluminum as free as possible of the precipitated hydroxide.

The process can be carried out at temperatures between 0 and 80° C. The rate of reaction increases with increasing temperature but at temperatures above 60° C. boehmite is formed to an increasing extent besides nordstrandite. The purest products are obtained at temperatures between 20 and 60° C.

The reaction may be carried out continuously or as a batch process. In the latter case, the precipitate is filtered after the development of hydrogen has stopped, and washed with water. The filtered alkylenediamine solution can be re-used without processing. As water is consumed in the reaction, a corresponding amount must be added; the wash water of the precipitate may be used for this purpose.

In the continuous process, the filtered alkylenediamine solution, to which the required amount of water has been added, and finely comminuted aluminum are introduced into the reaction vessel in amounts corresponding to the amount of nordstrandite emulsion continuously withdrawn from the bottom of the reaction vessel. In order to complete the reaction, the emulsion is allowed to after-react in a separate vessel until the development of hydrogen has completely ceased. The thus obtained nordstrandite is, in most cases, easy to filter and can be washed with water free of alkylenediamines. In all cases, the nitrogen content was below 0.1%. To obtain a water-free product, the thoroughly washed precipitate may be dried either at elevated temperature, or the water may be replaced by alcohol, acetone, or the like and the product may then be dried at room or slightly elevated temperature.

The purity of the end product depends on the purity of the starting materials. When very pure aluminum is used, a correspondingly pure nordstrandite is obtained. The product obtained by my process is free from bayerite and gibbsite, as shown by X-ray and infrared analysis. Boehmite, which may have been produced in the reaction, can be dissolved by dilute aqueous acids, against which nordstrandite is rather stable. For instance, dilute hydrochloric acid, formic or acetic acid may be used for the peptization.

Over the known procedure, the new process has the advantages of simple manipulation and economy. A particular advantage is that the time consuming ageing procedure can be dispensed with. As the alkylenediamine assumes substantially the function of a catalyst, only the small amounts which are getting lost in the processing steps, have to be replaced. The hydrogen generated in the reaction can be utilized for other purposes.

The obtained nordstrandite can be used, for instance, as catalyst or as a catalyst support. By addition of alkylenediamine salts, or oxides or hydroxides or salts of metals, during or after the preparation, the end product may be made cationic or anionic. In addition, nordstrandite may be employed for the production of alumina drying agents and for other applications.

The following examples, which were carried out in an air atmosphere with continuous removal of the developed hydrogen, are given to illustrate the invention.

*Example 1*

2 g. of a very fine aluminum powder, which was coated with a thin layer of stearic acid as protection against the oxygen of the atmosphere, were added, with slight stirring, to 250 ml. of a 10% aqueous ethylenediamine solution in a wide 500 ml. container of polyethylene at a temperature of 20° C. Already after a few seconds, the development of hydrogen started. After 3 hours, the precipitate was filtered off, washed first with water and then briefly with acetone, and dried at room temperature. There was obtained pure nordstrandite, which contained only a very small proportion of X-ray amorphous boehmite.

*Example 2*

A glass round-bottom flask provided with a reflux cooler and stirrer was filled with 2 liters of a 10% aqueous ethylenediamine solution, the temperature of which was kept constant, by means of a thermostat, at a temperature of 40° C. A total of 50 g. of finely powdered aluminum, which during its preparation had been stabilized with stearic acid for the protection of its surface, was successively added with stirring to said ethylenediamine solution. 57.6 liters of hydrogen were developed until the reaction was terminated. The formed nordstrandite was filtered off, washed with water and alcohol, and dried at 80° C. Yield: 138 g.

40 g. of the dry product were moistened with some methanol and then treated with 500 ml. of 0.1 molar aqueous hydrochloric acid for 2 hours. After filtration, washing with water, and drying at 100° C., 36 g. of pure nordstrandite were obtained.

*Example 3*

3 g. of aluminum powder, which had not been stabilized with stearic acid, were added to 200 ml. of a 20% ethylenediamine solution at 25° C. The reaction vessel was shaken from time to time, and after termination of the reaction the precipitate was filtered off, washed with water, and dried at 100° C. The obtained product consisted substantially of pure nordstrandite.

*Example 4*

Example 1 was repeated with the sole difference that, instead of the 10% aqueous ethylenediamine solution, a 10% aqueous dl-propylenediamine was employed. The dry end product contained neither bayerite nor hydrargillite and consisted, except of a small proportion of boehmite, of pure nordstrandite.

*Example 5*

2 g. of a very fine aluminum powder, which was protected against atmospheric oxygen by a thin coating of stearic acid, were added to 750 ml. of a 1% aqueous ethylenediamine solution at 50° C. The batch was gently stirred from time to time. After termination of the reaction, the precipitate was filtered off, washed with water and alcohol, and dried at 80° C.

I claim:
1. A process for the preparation of nordstrandite $Al(OH)_3$ comprising reacting aluminum with an aqueous solution of an alkylenediamine having 2 to 4 C atoms at a temperature of 0 to 80° C. and filtering and washing the obtained precipitate which is essentially trihydrate alumina substantially only in the form of nordstrandite.
2. The process as claimed in claim 1 wherein a temperature of 20 to 60° C. is used.
3. The process as claimed in claim 1 wherein the concentration of the alkylenediamine in the aqueous solution is 1 to 40 percent.
4. The process as claimed in claim 1 where the alkylenediamine is ethylenediamine.
5. The process as claimed in claim 1 wherein the aluminum is used in finely comminuted form.
6. The process as claimed in claim 1 wherein the reaction is carried out with stirring.
7. The process as claimed in claim 1 comprising treating the obtained reaction product with a dilute aqueous acid selected from the group consisting of hydrochloric acid, formic acid, and acetic acid to remove boehmite impurities.

References Cited by the Examiner
UNITED STATES PATENTS

| | | | |
|---|---|---|---|
| 2,733,219 | 1/1956 | Block | 23—143 X |
| 2,804,433 | 8/1957 | Hewert et al. | 23—143 X |
| 2,958,581 | 11/1960 | Hewert et al. | 23—143 |
| 3,058,907 | 10/1962 | Van Nordstrand et al. | 23—143 X |

MAURICE A. BRINDISI, *Primary Examiner.*